(12) United States Patent
Cornil

(10) Patent No.: US 6,683,694 B2
(45) Date of Patent: Jan. 27, 2004

(54) TELEMETRY EQUIPMENT FOR THE TWO-DIMENSIONAL OR THREE-DIMENSIONAL MAPPING OF A VOLUME

(75) Inventor: Yan Cornil, Hyeres (FR)

(73) Assignee: Scertab - Societe Civile d'Etudes et de Recherche en Telemetrie Appliquee au Batiment (FR)

( * ) Notice: Subject to any disclaimer, the term of this patent is extended or adjusted under 35 U.S.C. 154(b) by 0 days.

(21) Appl. No.: 10/222,142

(22) Filed: Aug. 16, 2002

(65) Prior Publication Data

US 2003/0086096 A1 May 8, 2003

Related U.S. Application Data

(63) Continuation of application No. PCT/FR01/00482, filed on Feb. 19, 2001.

(51) Int. Cl.⁷ ................................................ G01B 11/24
(52) U.S. Cl. ...................... 356/627; 356/614; 356/4.01
(58) Field of Search ........................... 356/614, 627, 356/628, 625, 3, 3.01, 3.14, 3.15, 3.16, 4.06, 9, 4.01, 11–12; 250/203 R, 203.6, 208.1, 201.9, 332

(56) References Cited

U.S. PATENT DOCUMENTS

| | | | | |
|---|---|---|---|---|
| 4,561,776 A | * | 12/1985 | Pryor | 356/72 |
| 5,008,522 A | * | 4/1991 | Lundin | 250/203.6 |
| 5,093,563 A | * | 3/1992 | Small et al. | 250/201.9 |
| 5,247,487 A | | 9/1993 | Beliveau et al. | |
| 5,337,149 A | | 8/1994 | Kozah et al. | |
| 5,617,515 A | * | 4/1997 | MacLaren et al. | 700/264 |
| 5,675,514 A | * | 10/1997 | Lefebvre | 702/151 |
| 5,806,020 A | * | 9/1998 | Zykan | 702/159 |
| 5,886,775 A | * | 3/1999 | Houser et al. | 356/4.01 |
| 5,956,661 A | * | 9/1999 | Lefebvre et al. | 702/150 |

* cited by examiner

Primary Examiner—Frank G. Font
Assistant Examiner—Sang H. Nguyen
(74) Attorney, Agent, or Firm—Piper Rudnick LLP

(57) ABSTRACT

Telemetry equipment for two-dimensional or three-dimensional mapping of a space including a movable telemetry head including a first sensor for measuring a distance to a target within the space and a second sensor for measuring a distance to a third sensor; and a fixed unit for acquiring the position of the telemetry head in a fixed reference frame within the space, the fixed unit including the third sensor which performs the measurement of the distance between the second sensor and the third sensor.

16 Claims, 3 Drawing Sheets

TELEMETRY EQUIPMENT FOR THE TWO-DIMENSIONAL OR THREE-DIMENSIONAL MAPPING OF A VOLUME

RELATED APPLICATION

This is a continuation of International Application No. PCT/FR01/00482, with an international filing date of Feb. 19, 2001, which is based on French Patent Application No. 00/02038, filed Feb. 18, 2000.

FIELD OF THE INVENTION

This invention relates to the field of telemetry and of two-dimensional or three-dimensional cartography.

BACKGROUND

The reference points of a plane or the acquisition of the volume of an architectural or industrial space are generally determined by surveyors using successive plotted reference points and tracing of planes from these reference points.

Plotting interior reference points encounters many obstacles. It is slow and expensive if it is only performed manually because such plotting must be performed by a skilled person, generally a surveyor. It is also time-consuming if it is performed automatically with a device because the device must record a considerable number of data (fine angle plotting laser telemetry), the computer processing of which can require many hours.

It is necessary to carry out a computer-based construction of the image once the acquisition of points has been performed. Processing of the resultant image is time consuming (photogrammetric technique), complex and indeed not very reliable because of the difficulty of automatic interpretation of the results. Moreover, if these measurements are performed by a device, the device must be positioned in an absolute reference frame to collect the measurements. The technique used by motorized theodolites such as the double plotting technique according to which the theodolite plots its own position from one measurement to the next is precise, but time consuming.

Commonly used telemeters are elapsed time telemeters which exhibit a precision of about 3 cm (1 cm on average over multiple measurements) which is not compatible with the precision required for interior plotting.

French patent FR 2,630,539 has as its object processes for performing surveys of envelope meter distances constituted of plane surfaces using a laser beam telemeter. The process of the prior art consists of creating a means for the interior plotting, for the measurement of meter distances over small distances in the building interior and associating it with a computer-assisted design program to reproduce the envelopes and constitutive elements of a room in any desired form. The telemeter is used to measure the meter distances of the polar coordinates of any cloud of points P taken on each surface constituting the envelope from the same station S1. One then calculates the position of each plane, sphere, torus, cylinder or other simple surface. Then, the intersection of all of the surfaces is taken two by two to define the edges of the volume under consideration.

Such a process is delicate to implement because it is totally automated, implying the taking into account of all of the geometric situations which might be found in the field and the implementation of complicated computer processing.

Also known is U.S. Pat. No. 5,337,149 which describes equipment enabling creation of a computer-based model of a three-dimensional object of large dimensions as the data are acquired. This equipment of the prior art comprises a measurement device, a computer containing a computer-assisted drafting program, a data transmission device and a display screen. The distance measurement device takes measurements from a stable location and which can be moved. The location of measured points is calculated in relation to the distance of the measured point and the orientation of the measurement device. The device and the process function in a manner such that the user is connected with the computer-assisted drafting program and uses the measurement device as an input device to introduce the data into the program. Thus, the user can create a complete model of the object solely by taking the physical measurements of an object or a space without any limitation of movement around the object or the space, or through the space. It also describes a portable variant comprising an inertial unit.

Such equipment can only be used in a continuous space and does not enable acquisition of irregular volumes comprising masked zones, for example, an apartment comprising multiple rooms separated by doors. Moreover, the portable variant unit only provides a differential signal, the exploitation of which requires powerful computing means and frequent recalibrations.

Also known is U.S. Pat. No. 5,247,487, which describes a system for collecting measurements in space determining the position, orientation, form and/or operational characteristics of an environment. The system comprises a data-generating device and a modeling device. The data generated can then be transformed in a CADD (computer-assisted design and drafting) model of an existing or constructed environment, or used in another manner to obtain a three-dimensional topography of the environment.

This system employs a multiplicity of beacons positioned in the room to be analyzed.

It would therefore be advantageous to resolve the drawbacks of the prior art by providing a solution that makes it possible to reduce substantially the time required for the acquisition of useful information. It would also be advantageous to provide a process and equipment making it possible to associate the person and the machine in a manner to only measure that which is necessary, thereby reducing manual interventions to a minimum and optimizing the automatable functions.

SUMMARY OF THE INVENTION

This invention relates to telemetry equipment for two-dimensional or three-dimensional mapping of a space including a movable telemetry head including a first sensor for measuring a distance to a target within the space and a second sensor for measuring a distance to a third sensor, and a fixed unit for acquiring the position of the telemetry head in a fixed reference frame within the space, the fixed unit including the third sensor, which performs the measurement of the distance between the second sensor and the third sensor.

This invention also relates to a telemetry process for two-dimensional or three-dimensional mapping of a space including remotely acquiring a position and orientation of a laser telemeter (portable unit) in a fixed reference frame of a fixed unit within the space by manual plotting with a portable tool including a sensor emitting a visible laser beam, and measuring the distance between the telemeter and the fixed unit.

BRIEF DESCRIPTION OF THE DRAWINGS

Better understanding of the invention will be obtained from the description below which makes reference to the attached drawings in which.

DETAILED DESCRIPTION

Figure 1:
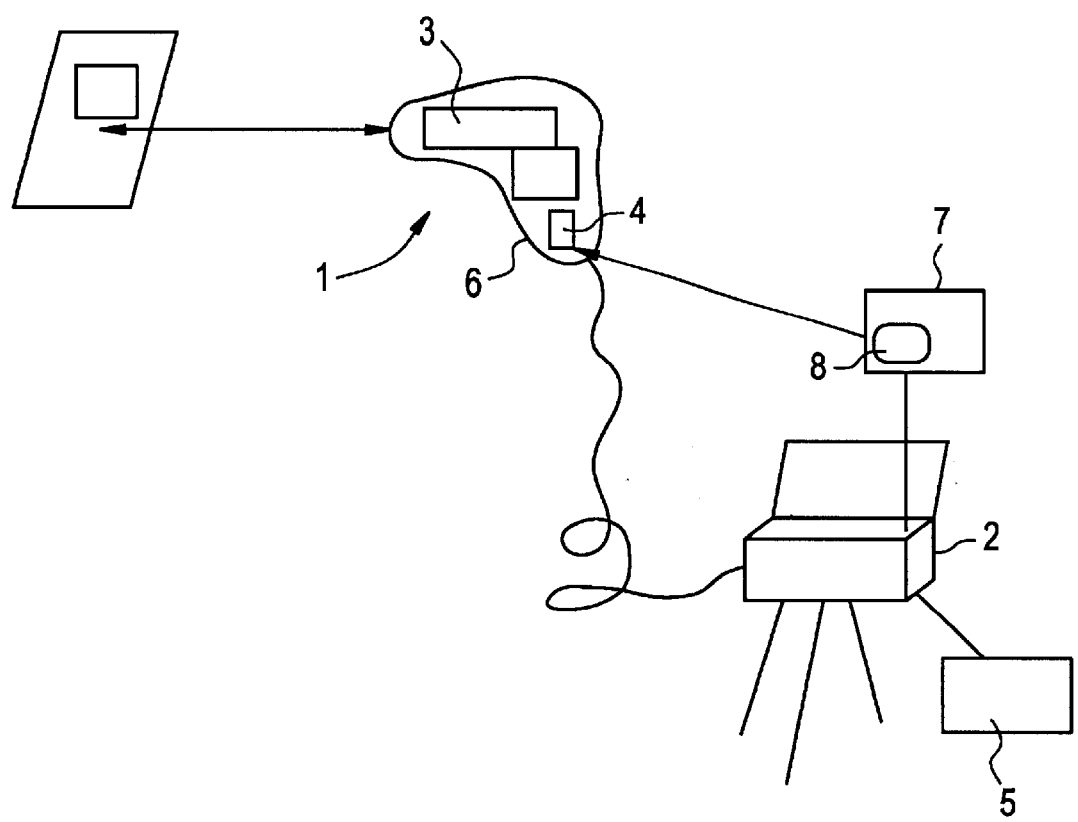
FIG. 1 represents a schematic view of an example of implementation of equipment according to aspects of the invention.

It will be appreciated that the following description is intended to refer to specific embodiments of the invention selected for illustration in the drawings and is not intended to define or limit the invention, other than in the appended claims.

In its most general sense, the invention relates to telemetry equipment for two-dimensional or three-dimensional mapping of a volume, the equipment comprising a telemetry head and a means for acquiring the position of the measurement head in a fixed reference frame. The equipment furthermore comprises an autonomous portable unit comprising the telemetry head and a fixed unit, the two units comprising means for remote acquisition of the position and orientation of the portable unit in the fixed reference frame.

The invention is, thus, composed of two complementary means:

a fixed station defining a reference point in the space to be mapped; and a mobile piece of telemetric measurement equipment which is easy to handle and to move in nooks and crannies.

The fixed station establishes the position of the mobile unit in its fixed reference frame. The mobile unit acquires the position of a point in space in relation to its mobile reference frame. The equipment exploits these two units of information to recalculate the data provided by the mobile unit in the fixed reference frame.

The fixed unit comprises means for determining the coordinates of the mobile unit in the fixed reference frame $R_c$, as well as a database in which are recorded a series of data comprising at least, for each acquisition $a_1$, the measured distance $D(a_1)$, the orientation $O(a_1)$ of the mobile unit at the moment of the acquisition and the coordinates $C(a_1)$ of the mobile unit.

The equipment advantageously comprises at least two sensors integral with the fixed reference frame $R_c$ transmitting an electric signal which is a function of the position of the reference frame of the mobile unit in the fixed reference frame $R_c$.

The mobile unit advantageously has at least one radiofrequency receiver, with the equipment comprising means for localization of the transmitter in the fixed reference frame.

According to one preferred mode of implementation, the telemetric head comprises one or more lasers, at least one of which emits visible radiation. According to a variant for mapping irregular volumes comprising partial partitions, the process comprises a step of placing the fixed equipment in a part common to two adjacent volumes. According to another variant, the process comprises a step consisting of placing a marker in a part common to two adjacent volumes and of performing the acquisition of at least one point of this marker from a first space for recording the coordinates $C_1(P_c)$ of this point in relation to a specific reference frame $R_1$ of the first space, of recording the coordinates of this same point by acquisition from a second space for recording the coordinates $C_2(P_c)$ in the reference frame $R_2$ and of calculating a transformation matrix such that the transform of $C_1(P_c)$ corresponds to $C_2(P_c)$ for the purpose of enabling the fusion of the base $B_1$ of the points acquired in the first space and the transformation of the base $B_2$ of the points acquired in the second space.

According to another variant, the process comprises a step of recording at least one element common to two separate spaces, of recording a first base $B_1$ of coordinates of the points of acquisition of the first space in relation to a specific reference frame $R_1$ of the first space, this base $B_1$ comprising the coordinates $C_1(P_c)$ in the reference frame $R_1$ of at least one common point $P_c$, of recording a second base $B_2$ of coordinates of the acquisition points of the second space in relation to a specific reference frame $R_1$ of the second space $R_2$, this base $B_2$ comprising the coordinates $C_2(P_c)$ of the common point $P_c$ in the reference frame $R_2$ and of applying to one of the bases a transformation matrix such that the transform of $C_1(P_c)$ corresponds to $C_2(P_c)$ for the purpose of allowing the fusion of base $B_1$ and the transformation of base $B_2$.

Turning now to the drawings generally, the equipment according to the invention comprises:

a portable plotting tool (1) comprising a telemeter with manual scanning;

a case (2) comprising a portable computer (5), a dual battery power system and a positioning system; and an electronic unit (7) equipped with a display screen (8) attached to the operator's belt.

The telemeter is in the form of a portable plotting tool (1) whose position and plotting direction are determined by a fixed device (2). The laser telemeter (using elapsed time, frequency scanning, phase scanning or frequency beating) measures the distance of the targeted object.

A calculator (5) is controlled by a computer program that provides for functions such as: reconstruction of simple surfaces and their assembly in a quasi-automatic manner, fusion of objects with an architecture type interface program to provide 2D/3D plans and compatible files of the AutoCAD type (trade name). The equipment optionally comprises a so-called "high head projection."

The portable plotting tool (1) has a handle (6) supporting a laser telemeter (3) and a positioning system (4). The unit (7) may be connected to:

the portable plotting tool (1) by an optical fiber; and the case (2) by a wire system, by radio communication or the like.

The laser is a visible laser of class 2 (ocular safety) having an acquisition speed of about 100 Hz and a measurement precision on the order of about a millimeter. The range is between about 0.1 and about 10 m, with additional ranges, for example, about 10–about 20 m or about 20–about 30 m.

The system (4) for positioning and orientation in space comprises one or more magnetic sensors. An error in the quality of the magnetic field (field curvature) can be detected by using two sensors. In the variant comprising two magnetic sensors, integrated in the handle, for example, it is possible to permanently calculate the distance separating them (from the measurements made) and compare the distance calculated from the signals emitted by the two sensors with the real distance determined in the factory. A comparison circuit emits a signal if the difference between the measured distance and the calculated distance exceeds a predetermined threshold value.

The same operation can be implemented by comparing the values of angles produced by each magnetic sensor in a manner to set off an alarm in the case of discordance between the two sensors. It is also possible to employ the reading of the positions of each sensor for recalculating the plotting direction. In the case of an alarm, the operator can recommence his measurements either by coming closer to the antenna or distancing himself from a close metallic mass.

The positioning system provides information on the positioning and orientation of the telemeter by a measurement in relation to another reference frame. The positioning method is either based on a magnetic or acoustic technique from a transmitting antenna or based on a radio or optical wave technique by triangulation from multiple beacons emitting different frequencies. This measurement system provides the position and orientation of the reference frame linked to T in relation to the antenna point A.

It is possible to determine the spatial coordinates of O in relation to A by means of a computer program. The program also makes it possible to process clouds of points in a manner to extract the plane position or other more complex objects (column, molding and the like). Object fusion techniques make it possible to reconstitute the totality of an apartment building.

Figure 2:
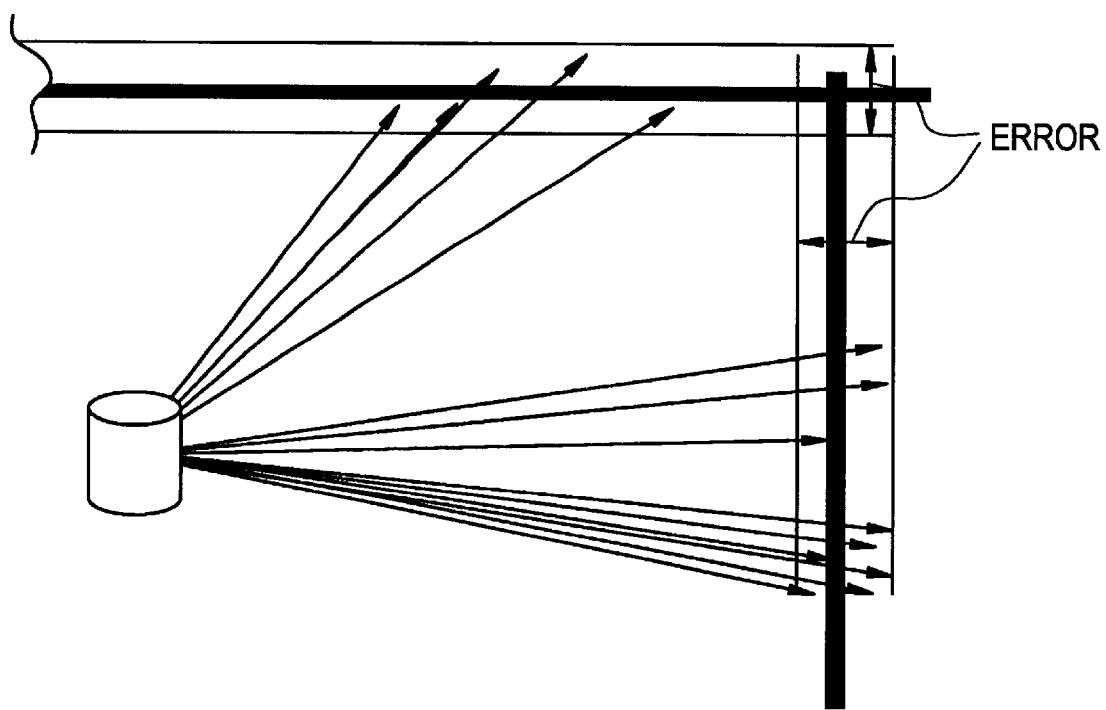
FIG. 2 represents a schematic view of an example of implementation of equipment according to a variant of implementation of the invention.

Use of the equipment according to the invention is described below with reference to FIG. 2. The user enters a room with the tool, places the case more or less in the middle of the room on a table or on the floor. The user then opens the case and starts up the computer. The user then initializes a sequence indicating to the computer that the user is beginning the acquisition of a new room. The user plots the position of a wall by scanning it with the visible laser beam: a button on the handle allows the user to indicate to the computer when to record the measurements. The user then plots the laser beam successively on all of the walls, the ceiling, floor, columns and the like. The user verifies the work in real time by observing the room be automatically drawn on the screen preferably carried on a belt.

The user indicates to the computer by clicking on the corresponding icon the type of object to measure and the position in the room (door, window, socket, baseboard or the like). Then the user can plot certain zones on which the user wants to emphasize fine details (borders, reliefs, moldings, frames and the like). The user furthermore plots on the screen the object(s) common to two measurements of successive rooms (door, wall and the like), thereby enabling the subsequent fusion of the rooms. The user then records other information stemming from other measurement means (tape measure, caliper rule) and possibly enters other information: the condition of the surfaces, the number of offices, closets and the like. In the case of hidden parts, the user measures the room under a different angle and fuses the measured room with the project in progress.

The equipment according to the invention can also be used to perform an exterior plotting (facade plotting). Similarly, it can be used in certain industrial applications: plotting forms for quality control and other applications.

Once the device has plotted the position of a point with the precision associated with it, the software program can calculate the best plane (or the best cylinder for a column) passing through these points. Because of the nature of the measurement, the higher the number of points, the better is the precision on the position of the plane. It varies with $\sqrt{N}$ if N is the number of measurements for a plane. The precision on the position of an angle is, thus, directly linked to $\sqrt{N}$.

If, for example, the measurement system plots 100 points of a plane with a precision of 1 cm, the position of this plane will thus be known with a precision of 1 cm/$\sqrt{100}$=1 mm.

The precision of the position of the angle of the wall (even if it is partially hidden) will be 1 mm.

The telemetry process according to the invention requires measuring a certain number of points per room which can be listed as follows:

at least ten points per plane;

two points for a door (diagonal); and two points for a window (diagonal).

The doors should be calibrated at the beginning. The user measures precisely a (or the) typical door(s) of the building such that they can subsequently be situated solely by their diagonal. The same is true, e.g., for the windows or columns.

Figure 3:
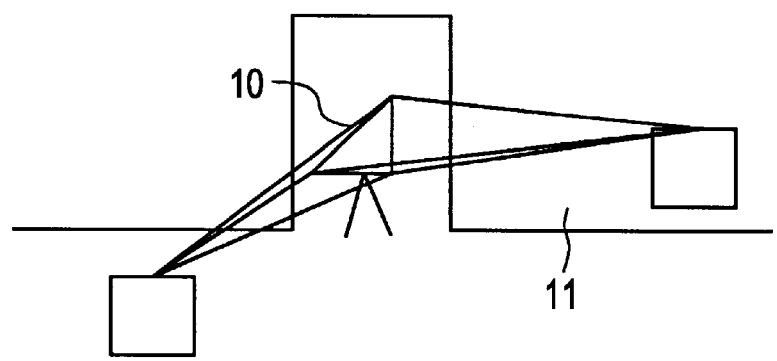
FIGS. 3 and 4 represent schematic views of two variants of implementation.

FIG. 3 represents a variant of implementation for mapping irregular spaces comprising volumes partially separated by partitions. A marker (10) is placed in a part common to two spaces separated by a partition (11). One then performs the acquisition of the point coordinates of this marker from a first space and then from a second space. The acquisition data is recorded in two distinct bases containing moreover the data relative to the acquisitions in the corresponding space.

The fusion of these two bases can be implemented after recalibration of the bases by application of a transformation matrix determined with the coordinates of the points of the markers recovered after application of the transformation matrix. This allows mapping of volumes comprising zones that are not visible from a common point.

Figure 4:
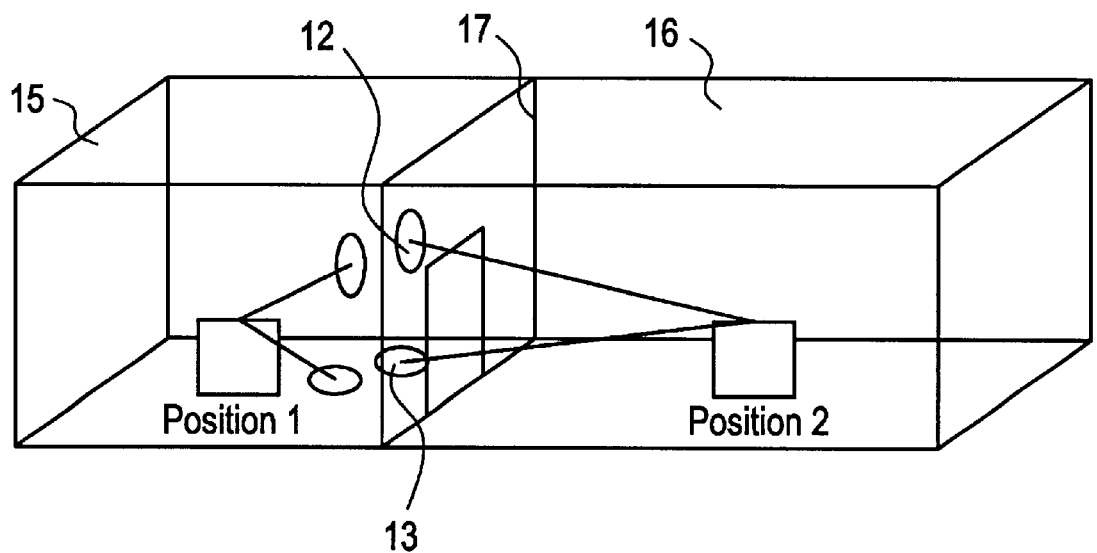

FIG. 4 illustrates another method consisting of performing the acquisition of several common points (12, 13) (for example, doors, windows or walls) or pairs of elements the relative position of which is known. One then performs the mapping of the two volumes (15, 16) separated by a partition (17). A transformation matrix is then calculated to enable fusion of the two cartographic bases.

This invention has been described above as a nonlimitative example. One of ordinary skill in the art will be able to propose diverse variants without departing from the framework or scope of the invention as defined in the appended claims.

What is claimed is:

1. Telemetry equipment for two-dimensional or three-dimensional mapping of a space comprising:

a movable telemetry head comprising a first sensor for measuring a distance to a target within the space and a second sensor for measuring a distance to a third sensor; and a fixed unit for acquiring the position of the telemetry head in a fixed reference frame within the space, the fixed unit comprising the third sensor which performs the measurement of the distance between the second sensor and the third sensor.

2. The telemetry equipment according to claim 1, the fixed unit comprises means for determining coordinates of the telemetry head in the fixed reference frame and a database in which are recorded a series of data comprising at least, for each acquisition $a_1$, a measured distance $D(a_1)$, an orientation $O(a_1)$ of the telemetry head at a moment of acquisition and coordinates $C(a_1)$ of the telemetry head.

3. The telemetry equipment according to claim 1, wherein the third sensor emits an electric signal which is a function of the position of the fixed unit in the fixed reference frame.

4. The telemetry equipment according to claim 1, wherein the third sensor transmits 3 coordinates and 3 angles.

5. The telemetry equipment according to claim 1, wherein the second sensor comprises means for generating an alarm signal in the case of drift.

6. The telemetry equipment according to claim 1, wherein the telemetry head has at least one radio-frequency transmitter and means for localization of the transmitter in the fixed reference frame.

7. The telemetry equipment according to claim 1, wherein the telemetry head comprises at least one laser emitting visible radiation.

8. The telemetry equipment according to claim 1, wherein the fixed unit further comprises a memory containing a library of objects.

9. A telemetry process for two-dimensional or three-dimensional mapping of a space comprising:

remotely acquiring a position and orientation of a laser telemeter in a fixed reference frame of a fixed unit within the space by manual plotting with a portable tool comprising a first sensor emitting a visible laser beam, and measuring the distance between the telemeter and the fixed unit utilizing a second sensor included in the telemeter, and a third sensor included in the fixed unit.

10. The telemetry process according to claim 9, further comprising calculating in real time an image from acquisition points to allow verification of plotting.

11. The telemetry process according to claim 9, further comprising plotting selected points of more precise reference positioning or certain zones of fine details.

12. The telemetry process according to claim 9, further comprising inputting information into the fixed unit generated from an additional sensor.

13. The telemetry process according to claim 9, further comprising placing the fixed unit in a location common to two adjacent spaces.

14. The telemetry process according to claim 9, further comprising:

placing a marker in a location common to two adjacent spaces, performing the acquisition of at least one point of the marker from a first space for recording coordinates $C_1(P_c)$ in relation to a specific reference frame $R_1$ of the first space, recording coordinates of the same point by acquisition from a second space for recording coordinates $C_2(P_c)$ in a reference frame $R_2$, and calculating a transformation matrix such that the transform of $C_1(P_c)$ corresponds to $C_2(P_c)$ for the purpose of enabling fusion of base $B_1$ of points acquired in the first space and the transformation of base $B_2$ of points acquired in the second space.

15. The telemetry process according to claim 9, further comprising:

recording at least one element common to two separate spaces, recording a first base $B_1$ of coordinates of points of acquisition of the first space in relation to a specific reference frame $R_1$ of the first space, wherein base $B_1$ comprises coordinates $C_1(P_c)$ in the reference frame $R_1$ of at least one common point $P_c$, recording a second base $B_2$ of coordinates of acquisition points of the second space in relation to a specific reference frame $R_1$ of the second space $R_2$, wherein base $B_2$ comprises coordinates $C_2(P_c)$ of the common point $P_c$ in the reference frame $R_2$, and applying to one of the bases a transformation matrix such that transform of $C_1(P_c)$ corresponds to $C_2(P_c)$ to permit fusion of base $B_1$ and transformation of base $B_2$.

16. Telemetry equipment for the two-dimensional or three-dimensional mapping of a volume, said equipment comprising a telemetry head and a means for acquiring the position of said measurement head in a fixed reference frame, the telemetry equipment being constituted by an autonomous portable unit comprising a telemetry head and a fixed unit, the two units comprising means for remote acquisition of the position and orientation of the portable unit in said fixed reference frame, wherein the means for remote acquisition comprises at least two sensors, a first sensor measuring a distance, a second sensor measuring a position and a direction; a third sensor performing the measurement of the distance between the second sensor and the third sensor.

* * * * *